United States Patent
Kang et al.

(10) Patent No.: US 10,760,523 B1
(45) Date of Patent: Sep. 1, 2020

(54) CONTROL OF FUEL INJECTION IN AN INTERNAL COMBUSTION ENGINE BASED ON CONVERGED FUEL INJECTOR SLOPE

(71) Applicant: GM GLOBAL TECHNOLOGY OPERATIONS LLC, Detroit, MI (US)

(72) Inventors: Jun-mo Kang, Ann Arbor, MI (US); Hanho Yun, Oakland Township, MI (US); Insu Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/443,310

(22) Filed: Jun. 17, 2019

(51) Int. Cl.
*F02D 41/26* (2006.01)
*F02D 41/40* (2006.01)
*F02D 41/20* (2006.01)
*F02D 41/18* (2006.01)
*F02D 41/14* (2006.01)

(52) U.S. Cl.
CPC ....... *F02D 41/402* (2013.01); *F02D 41/1454* (2013.01); *F02D 41/182* (2013.01); *F02D 41/20* (2013.01); *F02D 2041/2027* (2013.01); *F02D 2200/024* (2013.01)

(58) Field of Classification Search
CPC ...... F02D 41/402; F02D 41/182; F02D 41/20; F02D 41/1454; F02D 2041/2027; F02D 2200/024

USPC ......... 123/472, 479, 480, 490; 701/103–105, 701/107; 73/114.72
See application file for complete search history.

(56) References Cited

U.S. PATENT DOCUMENTS

| | | | |
|---|---|---|---|
| 7,877,189 B2 * | 1/2011 | Leone | F02B 47/02 123/1 A |
| 9,689,339 B2 | 6/2017 | Kang et al. | |
| 10,393,056 B2 * | 8/2019 | Pursifull | F02D 41/3845 |
| 2011/0295488 A1 | 12/2011 | Ramappan et al. | |
| 2016/0177855 A1 * | 6/2016 | Kusakabe | F02M 51/0685 123/490 |
| 2019/0178223 A1 | 6/2019 | Zhao et al. | |

* cited by examiner

*Primary Examiner* — Hai H Huynh
(74) *Attorney, Agent, or Firm* — Quinn IP Law

(57) ABSTRACT

A system and method for controlling operation of an internal combustion engine having at least one fuel injector. A controller is configured to selectively command the at least one fuel injector to deliver a primary fuel injection of a first fuel quantity and a secondary fuel injection of a second fuel quantity. The first fuel quantity is above a predefined threshold and the second fuel quantity is at or below the predefined threshold. The controller is configured to command a primary pulse width and a secondary pulse width, based in part on a respective desired fuel injection mass and respective initialized values of fuel injector slope. Operation of the fuel injectors is controlled based in part on a converged primary fuel injector slope and a converged secondary fuel injector slope determined at partially from a comparison of a calculated fuel mass and an estimated fuel mass.

19 Claims, 2 Drawing Sheets

US 10,760,523 B1

CONTROL OF FUEL INJECTION IN AN INTERNAL COMBUSTION ENGINE BASED ON CONVERGED FUEL INJECTOR SLOPE

INTRODUCTION

The disclosure relates generally to controlling operation of an internal combustion engine having at least one fuel injector, and more specifically, to controlling fuel injection based on a converged fuel injector slope. Many internal combustion engines draw fresh air into an intake manifold through an inlet system and distribute the air to one or more cylinders. Fuel is injected into the cylinders and mixed with the air to create an air-fuel mixture to enable the combustion process. Controlling the injection of relatively small quantities of fuel is challenging due to the non-linear behavior characteristics exhibited by many fuel injectors at relatively small quantities of fuel.

SUMMARY

Disclosed herein are a system and method for controlling operation of an internal combustion engine in a vehicle having at least one fuel injector (for example, per cylinder). A controller is configured to selectively command the at least one fuel injector to deliver a primary fuel injection of a first fuel quantity and a secondary fuel injection of a second fuel quantity. The first fuel quantity is above a predefined threshold and the second fuel quantity is at or below the predefined threshold. The controller has a processor and tangible, non-transitory memory on which instructions are recorded. Execution of the instructions by the processor causes the controller to obtain a respective desired fuel injection mass for the primary fuel injection and the secondary fuel injection.

The primary fuel injection and the secondary fuel injection are characterized by a primary pulse width and a secondary pulse width respectively, the primary pulse width and the secondary pulse width being based in part on the respective desired fuel injection mass and respective initialized values of fuel injector slope. The controller is configured to determine a calculated fuel mass based in part on at least one measured engine variable and obtain an estimated fuel mass based in part on the primary pulse width and the secondary pulse width. A converged primary fuel injector slope and a converged secondary fuel injector slope are determined based in part on a comparison of the calculated fuel mass and the estimated fuel mass. Operation of the fuel injectors is controlled based in part on the converged primary fuel injector slope and the converged secondary fuel injector slope.

In one example, the predefined threshold is 5 milligrams. Obtaining the converged primary fuel injector slope and converged secondary fuel injector slope may include obtaining a primary fuel injector slope and a secondary fuel injector slope over a plurality of time steps, including a $k^{th}$ time step, based in part on the primary pulse width and the secondary pulse width. The primary fuel injector slope and the secondary fuel injector slope are updated at each of the plurality of time steps by minimizing a difference between the estimated fuel mass and the calculated fuel mass.

In one example, the primary fuel injector slope and the secondary fuel injector slope are updated based at least partially on a recursive least squares method. In another example, the at least one fuel injector is configured to deliver multiple secondary fuel injections each characterized by respective multiple secondary pulse durations. The estimated fuel mass ($M_{E,K}$) at the $k^{th}$ time step may be based in part on the primary pulse width ($W_P$) at the $k^{th}$ time step, a summation of the respective multiple secondary pulse durations ($\Sigma W_s$), the primary fuel injector slope ($\theta_{P,K}$) at the $k^{th}$ time step and the secondary fuel injector slope ($\theta_{S,K}$) at the $k^{th}$ time step such that ($M_{E,K}=\theta_{P,K}W_P+\theta_{S,K}\Sigma W_s$).

The converged primary fuel injector slope is obtained when a first difference between the primary fuel injector slope at the $k^{th}$ time step and the primary fuel injector slope at the (k−1) time step is less than a first predefined threshold. The converged secondary fuel injector slope is obtained when a second difference between the secondary fuel injector slope at the $k^{th}$ time step relative to the secondary fuel injector slope at the (k−1) time step is less than a second predefined threshold.

A mass air flow sensor and an air-to-fuel ratio sensor may be in communication with the controller and configured to obtain a mass air flow rate and an exhaust gas air-to-fuel ratio, respectively. The calculated fuel mass may be based at least partially on the mass air flow rate and the exhaust gas air-to-fuel ratio. In another example, a pressure sensor may be configured to dynamically monitor in-cylinder pressure generated in at least one cylinder of the internal combustion engine during each combustion event. The calculated fuel mass may be based in part on the in-cylinder pressure.

The above features and advantages and other features and advantages of the present disclosure are readily apparent from the following detailed description of the best modes for carrying out the disclosure when taken in connection with the accompanying drawings.

DETAILED DESCRIPTION

Figure 1:
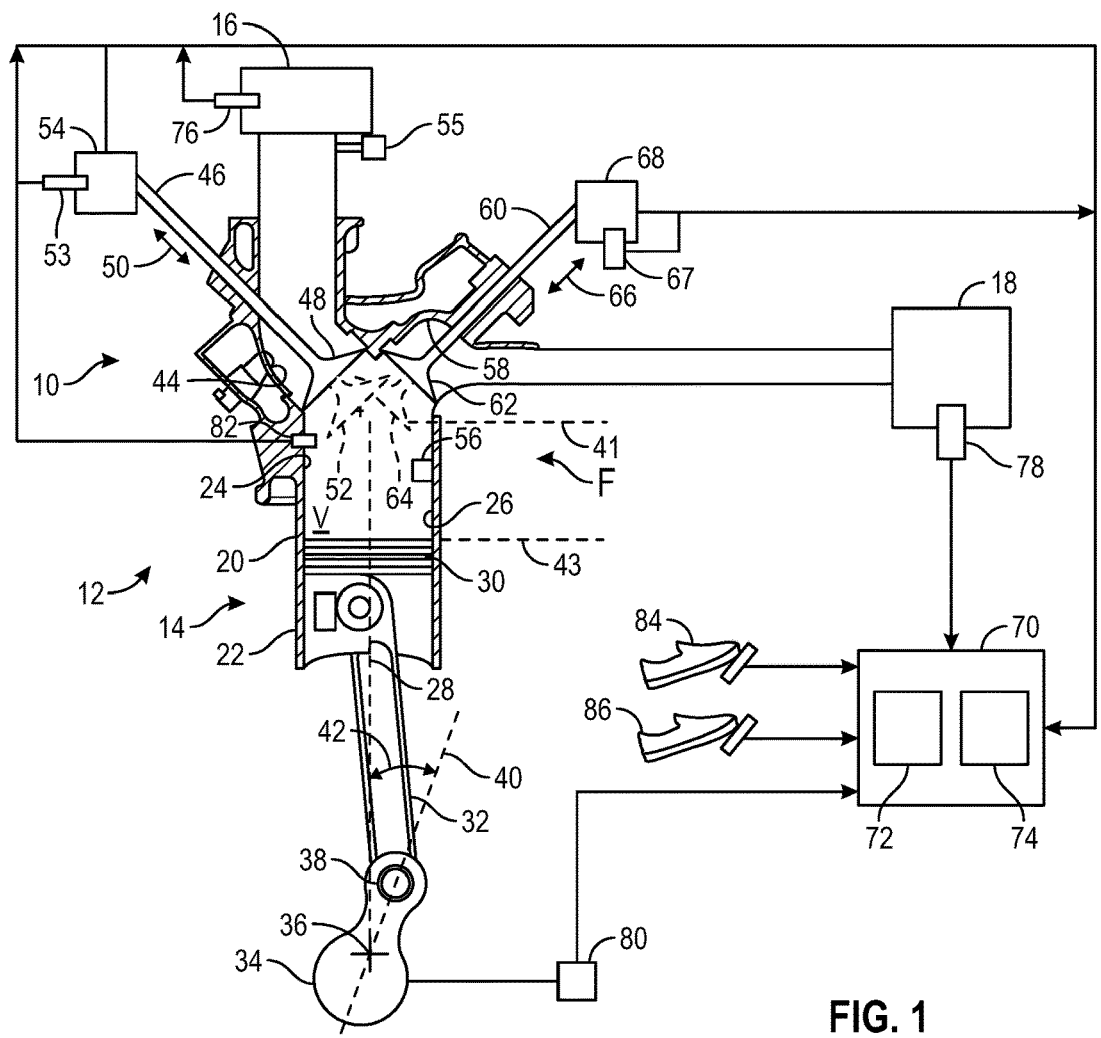
FIG. 1 is a schematic fragmentary view of a system for controlling operation of an internal combustion engine in a vehicle, the system including a controller.

Referring to the drawings, wherein like reference numbers refer to like components, FIG. 1 schematically illustrates a system 10 for controlling operation of a vehicle 12. The vehicle 12 may be a mobile platform, such as, but not limited to, a passenger car, sport utility vehicle, light truck, heavy duty vehicle, ATV, minivan, bus, transit vehicle, bicycle, robot, farm implement (e.g. tractor), sports-related equipment (e.g. golf cart), boat, plane, rail and train. The vehicle 12 may take many different forms and include multiple and/or alternate components and facilities.

Referring to FIG. 1, the vehicle 12 includes an internal combustion engine 14, referred to herein as engine 14, for combusting an air-fuel mixture in order to generate output torque. An intake manifold 16 is in fluid communication with the engine 14 and configured to receive fresh air from the atmosphere. The intake manifold 16 is fluidly coupled to the engine 14, and capable of directing air into the engine 14. The vehicle 12 includes an exhaust manifold 18 in fluid communication with the engine 14, and capable of receiving exhaust gases from the engine 14. As described below, the system 10 is configured to correct calibration of small quantity fuel injection in real-time based on measured engine variables. The system 10 improves the robustness of the engine 14 by improved combustion stability and consistent emissions reduction.

Referring to FIG. 1, the engine 14 includes an engine block 20 having at least one cylinder 22. The cylinder 22 has an inner cylinder surface 24 defining a cylinder bore 26. The cylinder bore 26 extends along a bore axis 28. The bore axis 28 extends along a center of the cylinder bore 26. A piston 30 is positioned inside the cylinder 22. The piston 30 is configured to move or reciprocate inside the cylinder 22 along the bore axis 28 during the engine cycle.

The engine 14 includes a rod 32 pivotally connected to the piston 30. Due to the pivotal connection between rod 32 and the piston 30, the orientation of the rod 32 relative to the bore axis 28 changes as the piston 30 moves along the bore axis 28. The rod 32 is pivotally coupled to a crankshaft 34. Accordingly, the movement of the rod 32 (which is caused by the movement of the piston 30) causes the crankshaft 34 to rotate about its center 36. A fastener 38, such as a pin, movably couples the rod 32 to the crankshaft 34. The crankshaft 34 defines a crank axis 40 extending between the center 36 of the crankshaft 34 and the fastener 38.

Referring to FIG. 1, a crank angle 42 is defined from the bore axis 28 to the crank axis 40. As the piston 30 reciprocates along the bore axis 28, the crank angle 42 changes due to the rotation of the crankshaft 34 about its center 36. Accordingly, the position of the piston 30 in the cylinder 22 can be expressed in terms of the crank angle 42. The piston 30 can move within the cylinder 22 between a top dead center (TDC) position (i.e., when the top of the piston 30 is at the line 41) and a bottom dead center (BDC) position (i.e., when the top of the piston 30 is at the line 43). The TDC position refers to the position where the piston 30 is farthest from the crankshaft 34, whereas the BDC position refers to the position where the piston 30 is closest to the crankshaft 34. When the piston 30 is in the TDC position (see line 41), the crank angle 42 may be zero (0) degrees. When the piston 30 is in the BDC position (see line 43), the crank angle 42 may be one hundred eighty (180) degrees.

Referring to FIG. 1, the engine 14 includes at least one intake port 44 in fluid communication with both the intake manifold 16 and the cylinder 22. The intake port 44 allows gases, such as air, to flow from the intake manifold 16 into the cylinder bore 26. The engine 14 includes at least one intake valve 46 capable of controlling the flow of gases between the intake manifold 16 and the cylinder 22. Each intake valve 46 is partially disposed in the intake port 44 and can move relative to the intake port 44 between a closed position 48 and an open position 52 (shown in phantom) along the direction indicated by double arrows 50. When the intake valve 46 is in the open position 52, gas (e.g. air) may flow from the intake manifold 16 to the cylinder 22 through the intake port 44. When the intake valve 46 is in the closed position 48, gases, such as air, are precluded from flowing between the intake manifold 16 and the cylinder 22 through the intake port 44. A first cam phaser 54 may control the movement of the intake valve 46.

Referring to FIG. 1, the engine 14 may receive pressurized fuel from at least one fuel injector F, which may be a direct-injection fuel injector 56 configured to spray fuel under sufficiently high pressure directly into the combustion chamber of each cylinder 22 of the engine 14. In response to a fuel command (FC) from the controller 70, the fuel injector F is configured to inject a mass of fuel at a specific time. The number and location of the fuel injector F may be varied based in the application at hand, and may include port fuel injection and/or direct injection. In a non-limiting example, the vehicle 12 may include have two injectors per cylinder, for example, one in the intake port (see injector 55) and one in the cylinder 22. The cylinder 22 may be operatively connected to a spark plug (not shown) configured to produce an electric spark in order to ignite the compressed air-fuel mixture in the cylinder 22 at a specific time. It is to be understood that the engine 14 may include multiple cylinders with corresponding fuel injectors and corresponding spark plugs.

As noted above, the engine 14 can combust an air-fuel mixture, producing exhaust gases. The engine 14 further includes at least one exhaust port 58 in fluid communication with the exhaust manifold 18. The exhaust port 58 is also in fluid communication with the cylinder 22 and fluidly interconnects the exhaust manifold 18 and the cylinder 22. Thus, exhaust gases can flow from the cylinder 22 to the exhaust manifold 18 through the exhaust port 58.

Referring to FIG. 1, the engine 14 further includes at least one exhaust valve 60 capable of controlling the flow of exhaust gases between the cylinder 22 and the exhaust manifold 18. Each exhaust valve 60 is partially disposed in the exhaust port 58 and can move relative to the exhaust port 58 between closed position 62 and an open position 64 (shown in phantom) along the direction indicated by double arrows 66. When the exhaust valve 60 is in the open position 64, exhaust gases can flow from the cylinder 22 to the exhaust manifold 18 through the exhaust port 58. When the exhaust valve 60 is in the closed position 62, exhaust gases are precluded from flowing between the cylinder 22 and the exhaust manifold 18 through the exhaust port 58. A second cam phaser 68 may control the movement of the exhaust valve 60. Furthermore, the second cam phaser 68 may operate independently of the first cam phaser 54.

Figure 2:
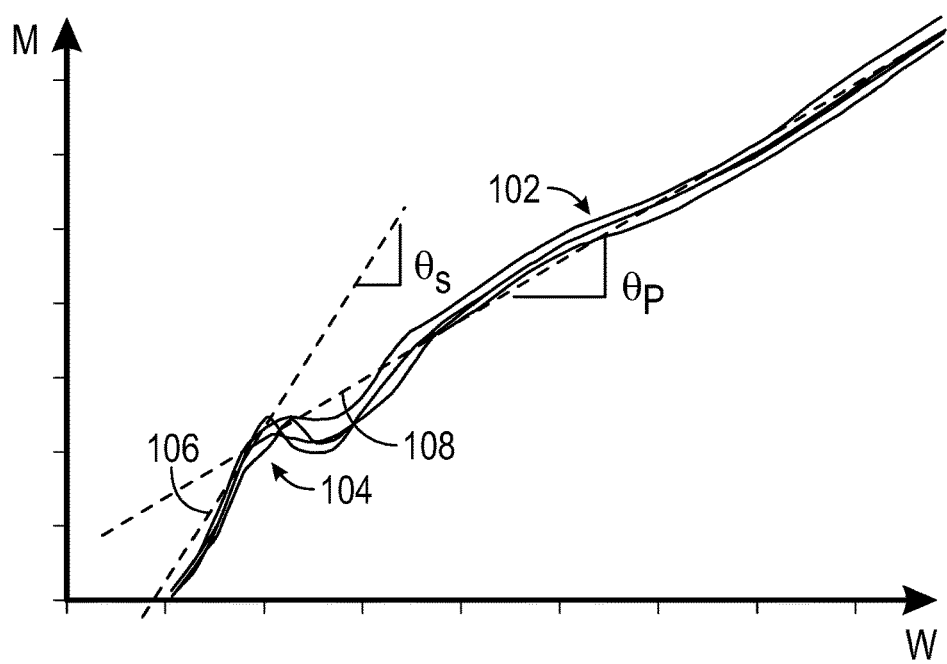
FIG. 2 is an example graph illustrating the fuel injection characteristics of an example fuel injector, with injected fuel mass on the vertical axis and fuel pulse width (time duration) on the horizontal axis.

FIG. 2 is an example graph illustrating the fuel injection characteristics of an example fuel injector, with injected fuel mass (M) on the vertical axis and fuel pulse width (W) (i.e., the fuel injection time period or commanded injector opening duration) on the horizontal axis. The multiple solid lines 102 indicate flow curves for a plurality of cylinders. As shown, the rate of fuel injection is different during two different periods, changing at approximately a switch-over point 104. Referring to FIG. 2, the first trace 108 and the second trace 106 represent a line of best fit for injected fuel mass (M) above and below the switch-over point 104, respectively. The first trace 108 is represented by a primary fuel injector slope ($\theta_P$) and the second trace 106 is represented by a secondary fuel injector slope ($\theta_S$). As shown in FIG. 2, the primary fuel injector slope ($\theta_P$) is smaller than the secondary fuel injector slope ($\theta_S$). Thus, when injecting relatively small quantities of fuel (e.g., below the switch-over point 104), the rate of fuel injection is sensitive to fuel pulse width and may require relatively more precision. In other words, a small change in the fuel pulse width may affect combustion and thus may decrease performance and/or increase emissions. The actual amount of fuel injected into the cylinder 22 (see FIG. 1) may change even with the same fuel pulse width (W) as the fuel injectors age or the temperature of the engine 14 changes. This effect is accentuated in relatively small quantity fuel injection, which may lead to increased emissions and other effects.

Referring to FIG. 1, a controller 70 is in electronic communication with the engine 14. The controller 70 is configured to selectively command the at least one fuel injector to deliver a primary fuel injection of a first fuel quantity and a secondary fuel injection of a second fuel quantity. The first fuel quantity is above a predefined threshold and the second fuel quantity is at or below the predefined threshold. The predefined threshold may be selected to coincide with the switch-over point 104 (see FIG. 2). In one example, the predefined threshold is 5 milligrams. It is understood that the predefined threshold may vary based on the application at hand.

Referring to FIG. 1, the controller 70 includes at least one processor 72 and at least one memory 74 (or other non-transitory, tangible computer readable storage medium) on which instructions are recorded for executing method 200, shown in FIG. 3, and described below. The system 10 (through execution of the method 200) employs real-time correction and learning of fuel pulse width based on measured engine variables. The system 10 eliminates the need to calibrate individual injectors as a function of temperature or injector aging. The memory 74 can store controller-executable instruction sets, and the processor 72 can execute the controller-executable instruction sets stored in the memory 74.

The controller 70 of FIG. 1 is specifically programmed to execute the steps of the method 200 and may receive inputs from various sensors. Referring to FIG. 1, a mass air flow (MAF) sensor 76 may be in communication (e.g., electronic communication) with the controller 70 and capable of measuring an air flow rate through the intake manifold 16. A wide range AFR sensor 78 may be in communication with the controller 70 and the exhaust manifold 18, as shown in FIG. 1. The controller 70 may obtain an air-to-fuel ratio (AFR) based on input signals from the wide range AFR sensor 78. Referring to FIG. 1, a crank sensor 80 is operative to monitor crankshaft rotational position, i.e., crank angle and speed. A cylinder pressure sensor 82 may be employed to obtain the in-cylinder combustion pressure of the at least one cylinder 22 during each combustion event. The cylinder pressure sensor 82 may be monitored by the controller 70 to determine an indicated-mean-effective-pressure (IMEP) for each cylinder 22 for each combustion cycle.

Additionally, the parameters may be obtained via "virtual sensing", such as for example, modeling based on other measurements. For example, the controller 70 may be programmed to determine the air-to-fuel ratio based on other methods or sensors, without the wide range AFR sensor 78. The controller 70 is in communication with the first and second cam phasers 54, 68 and can therefore control the operation of the intake and exhaust valves 46, 60. The controller 70 is also in communication with first and second position sensors 53, 67 that are configured to monitor positions of the first and second cam phasers 54, 68, respectively. The controller 70 is programmed to receive a torque request from an operator input or an auto start condition or other source monitored by the controller 70. The controller 70 is configured to receive input signals from an operator, such as through an accelerator pedal 84 and brake pedal 86, to determine the torque request.

Figure 3:
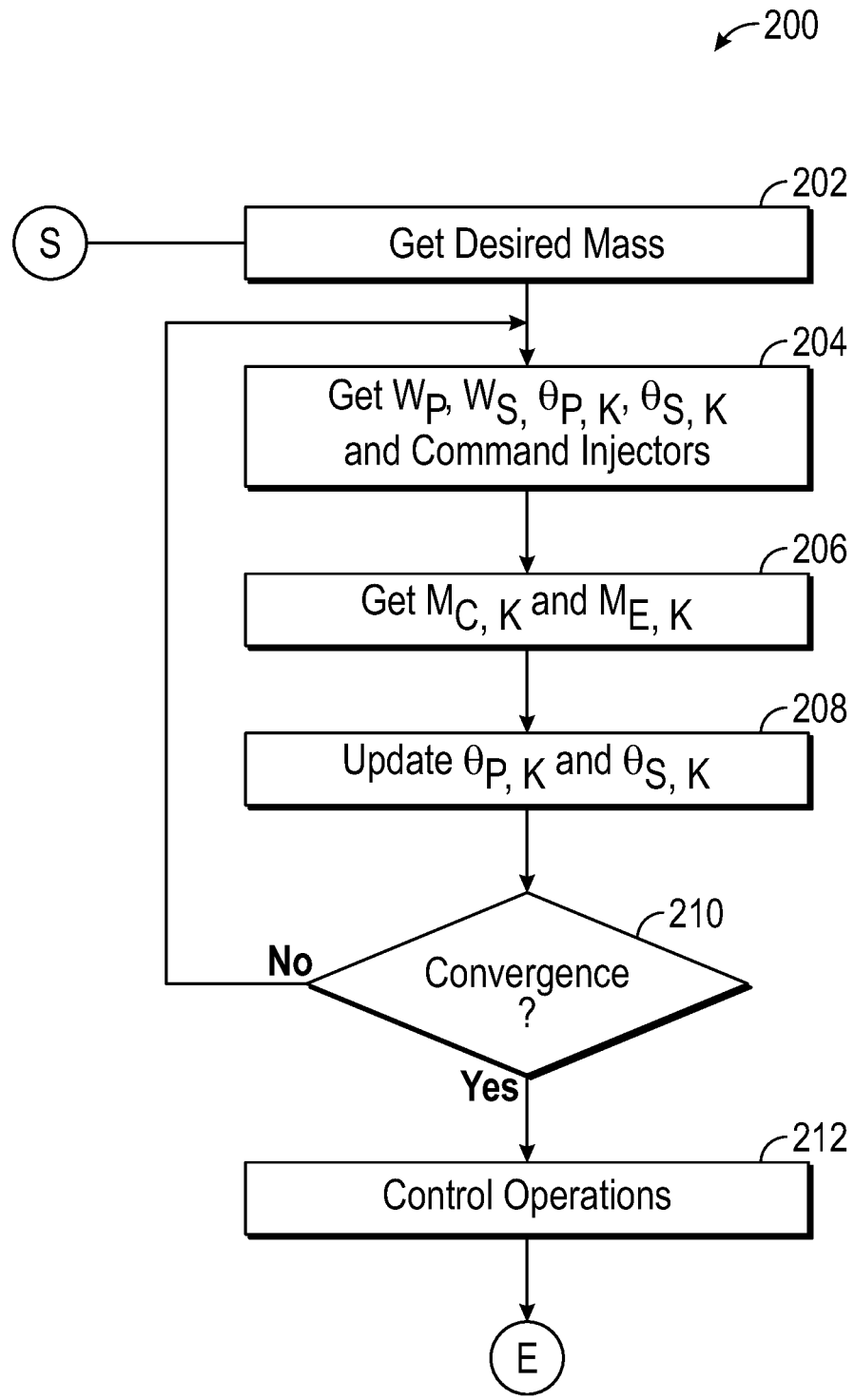
FIG. 3 is a flowchart for a method executable by the controller of FIG. 1.

Referring to FIG. 3, method 200 may begin with block 202, where the controller 70 is programmed to obtain a primary desired fuel injection mass ($M_{P,\ desired}$) and a secondary desired fuel injection mass ($M_{S,\ desired}$) for controlling a torque output of the engine 14. The method 200 of FIG. 3 may be activated when multiple fuel injections are indicated. For example, an enabling condition for the method 200 (to be started) may be when at least two fuel injections are indicated for a particular desired torque, with one of the at least two fuel injections being above the predefined threshold and the other being at or below the predefined threshold. Whenever torque is requested by an operator of the vehicle 12 (at a given engine speed and temperature), the controller 70 is configured to determines the number of injections, injection timing and fuel mass of each injection to maximize combustion performance (e.g. minimum fuel consumption and emissions) while meeting predefined constraints such as (e.g. knocking and combustion stability). The primary desired fuel injection mass ($M_{P,\ desired}$) and a secondary desired fuel injection mass ($M_{S,\ desired}$) may be based on a predefined injection strategy available to those skilled in the art, which may depend on load, engine speed, temperature and other factors. The predefined injection strategy for the controller 70 may be selected from an internal communication channel, such as for example, a Controller Area Network. In other words, the controller 70 is configured to initiate the method 200 when multiple fuel injections are necessitated and/or optimal. The method 200 proceeds to block 204.

Per block 204 of FIG. 3, the controller 70 is programmed or configured to obtain a primary pulse width ($W_P$) and a secondary pulse width ($W_S$). The primary pulse width ($W_P$) is based in part on the primary desired fuel injection mass ($M_{P,desired}$) and an initialized value of the primary fuel injector slope ($\theta_P^0$) such that:

$$W_P = \frac{1}{\theta_P^0} M_{P,Desired}.$$

The secondary pulse width ($W_S$) is based in part on the secondary desired fuel injection mass ($M_{S,desired}$) and an initialized value of the secondary fuel injector slope ($\theta_S^0$) such that:

$$W_S = \frac{1}{\theta_S^0} M_{S,Desired}.$$

The respective initialized values of the primary and secondary fuel injector slope may be selected based on the application at hand. Also, per block 204, the controller 70 is programmed to command the at least one fuel injector F to respectively deliver the primary fuel injection and the secondary fuel injection with the primary pulse width ($W_P$) and the secondary pulse width ($W_S$) obtained herein.

The method 200 is iterated or run over a plurality of time steps, including k time steps, until a respective converged value of the primary fuel injector slope ($\theta_P$) and the secondary fuel injector slopes ($\theta_P$) is obtained (block 210 below). In the first time step (k=0), respective initialized values of fuel injector slope are employed. As described below, in each subsequent time step, the value of the primary fuel injector slope ($\theta_P$) and the secondary fuel injector slopes ($\theta_S$) is updated until convergence is obtained.

From block 204, the method 200 proceeds to block 206. Per block 206 of FIG. 3, the controller 70 is programmed to obtain a calculated fuel mass ($M_{C,\ K}$) and an estimated fuel mass ($M_{E,\ K}$), each at the $k^{th}$ time step. The calculated fuel mass is based in part on at least one measured engine variable and may be calculated with a torque model and cylinder pressure trace, exhaust gas air-to-fuel ratio and/or other method available to those skilled in the art. In one example, the calculated fuel mass ($M_{C,\ K}$) is obtained as a product of the mass air flow rate (MAF) and the exhaust gas air-to-fuel ratio (AFR), integrated over the time, for the time period (dt) of the mass air flow rate reading, such that: $M_{C,K}=\int MAF*AFRdt$. The mass air flow rate and the exhaust gas air-to-fuel ratio may be obtained from the mass air flow (MAF) sensor 76 (see FIG. 1) and the wide range AFR sensor 78 or from virtual simulation using data from other sensors in communication with controller 70.

In another example, an inverse torque model (correlating injected fuel mass and cylinder pressure generated during a combustion event) available to those skilled in the art may be employed to obtain the calculated fuel mass ($M_{C,K}$) at the $k^{th}$ time step. The cylinder pressure sensor 82 (see FIG. 1) of the at least one cylinder 22 may be employed to obtain the in-cylinder combustion pressure during each combustion event along with an encoder signal. The indicated mean effective pressure (IMEP), which is the average pressure produced in the combustion chamber during the operating cycle of the engine 14, may be used as an input to the inverse torque model, with the output being the injected fuel mass. The indicated mean effective pressure (IMEP) may be measured by multiple cylinder pressure sensors or estimated by one cylinder pressure sensor along with an encoder signal.

Also, per block 206, the controller 70 is programmed to obtain an estimated fuel mass ($M_{E,K}$) based in part on the primary pulse width ($W_P$), the secondary pulse width ($W_S$). In one example, the at least one fuel injector F is configured to deliver multiple secondary fuel injections each characterized by respective pulse durations. The estimated fuel mass ($M_{E,K}$) at the $k^{th}$ time step may be based in part on the primary pulse width ($W_P$) at the $k^{th}$ time step, a summation of the respective pulse durations ($\Sigma W_S$), the primary fuel injector slope ($\theta_{P,K}$) at the $k^{th}$ time step and the secondary fuel injector slope ($\theta_{S,K}$) at the $k^{th}$ time step such that ($M_{E,K}=\theta_{P,K}W_P+\theta_{S,K}\Sigma W_S$). The method 200 may proceed to block 208 from block 206.

Per block 208 of FIG. 3, the primary fuel injector slope ($\theta_{P,K}$) and the secondary fuel injector slope ($\theta_{S,K}$) at the $k^{th}$ time step are updated by minimizing a difference between the estimated fuel mass ($M_{E,K}$) and the calculated injected mass ($M_{C,K}$). In one example, the controller 70 is configured to employ a recursive least squares method to recursively finds the coefficients that minimize a weighted linear least squares cost function. The cost function here is the square of the difference ($M_{E,K}-M_{C,K}$). Other types of least mean squares methods and algorithms available to those skilled in the art (that minimize the difference ($M_{E,K}-M_{C,K}$)) may be employed.

Per block 210 of FIG. 3, the controller 70 is programmed to determine if a convergence is reached for the primary fuel injector slope and the secondary fuel injector slope ($\theta_{S,K}$) in the $k^{th}$ time step. A converged primary fuel injector slope ($\theta_P^*$) is obtained when a first difference between the primary fuel injector slope ($\theta_{P,K}$) at the kth time step and the primary fuel injector slope ($\theta_{P,K-1}$) at the (k−1) time step is less than a first predefined threshold. A converged secondary fuel injector slope ($\theta_S^*$) is obtained when a second difference between the secondary fuel injector slope ($\theta_{S,K-1}$) at the kth time step relative to the secondary fuel injector slope ($\theta_{S,K-1}$) at the (k−1) time step is less than a second predefined threshold. In other words, convergence is deemed to occur when the value of the primary (or secondary) fuel injector slope between two consecutive time steps or iterations is sufficiently close, for example, within 1%.

If there is no convergence, the method 200 loops back to block 204, where the primary pulse width ($W_P$) is re-calculated based on the primary desired fuel injection mass ($M_{P,desired}$) of the next engine event and the initialized value of the primary fuel injector slope ($\theta_P^0$), such that:

$$W_{P,K} = \frac{1}{\theta_P^0} M_{P,Desired}.$$

Similarly, the secondary pulse width ($W_S$) is re-calculated based on the secondary desired fuel injection mass ($M_{S,desired}$) of the next engine event and the initialized value of the secondary fuel injector slope ($\theta_S^0$), such that:

$$W_{S,K} = \frac{1}{\theta_S^0} M_{S,Desired}.$$

The fuel injector F is commanded to deliver fuel with the re-calculated primary pulse width and the re-calculated secondary pulse width, and blocks 206, 208 and 210 are repeated. When convergence is reached in block 210, the method 200 proceeds to block 212.

Per block 212, operation of the engine 14 and the fuel injector F is controlled based on the converged primary fuel injector slope ($\theta_P^*$) and the converged secondary fuel injector slope ($\theta_S^*$) obtained in block 210. The controller 70 is configured to deliver the primary fuel injection with the primary pulse width ($W_P$) based on the converged primary fuel injector slope ($\theta_P^*$) and the respective desired fuel injection mass ($M_{P,Desired}$) (for the primary fuel injection) of the next or subsequent engine event such that:

$$W_{P,K} = \frac{1}{\theta_P^*} M_{P,Desired}.$$

Similarly, the controller 70 is configured to deliver the secondary fuel injection with the secondary pulse width ($W_S$) based on the converged secondary fuel injector slope ($\theta_S^*$) and the respective desired fuel injection mass ($M_{S,Desired}$) (for the secondary fuel injection) of the next engine event such that:

$$W_{S,K} = \frac{1}{\theta_S^*} M_{S,Desired}.$$

The controller 70 (and execution of the method 200) improves the functioning of the vehicle 12 by enhancing the robustness of the fuel injection system and thus engine performance for many combustion modes. The system 10 provides a technical advantage of reducing cylinder-to-cylinder variation. The controller 70 of FIG. 1 may be an integral portion of, or a separate module operatively connected to, other controllers of the vehicle 12. The method 200 of FIG. 3 may be applied in an engine 14 having a homogeneous charge compression ignition (referred to herein as "HCCI") mode. HCCI mode is a form of internal combustion in which well-mixed fuel and oxidizer, such as air, are compressed to the point of auto-ignition. In the HCCI mode, fuel is injected during the intake stroke. Instead of using an electric discharge or spark to ignite a portion of the mixture, the density and temperature of the air-fuel mixture are raised by compression in the HCCI mode, until the entire mixture reacts spontaneously. The HCCI mode can be operated with lean air-to-fuel ratios since auto-ignited combustion has a low level of engine-out NOx emission, owing to a low peak combustion temperature. HCCI combustion may include multiple injections of fuel (e.g., two, three, or four) during each combustion cycle and/or lean air-to-fuel mixtures. It is to be understood that the method 200 may be applied to other engine modes as well.

The controller 70 includes a computer-readable medium (also referred to as a processor-readable medium), including other non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing vehicle employing a computer operating system such as one of those mentioned above, and may be accessed via a network in other one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of an internal combustion engine in a vehicle having at least one fuel injector, the system comprising:
    a controller configured to selectively command the at least one fuel injector to deliver a primary fuel injection of a first fuel quantity and a secondary fuel injection of a second fuel quantity, the first fuel quantity being above a predefined threshold and the second fuel quantity being at or below the predefined threshold;
    wherein the controller includes a processor and tangible, non-transitory memory on which instructions are recorded, execution of the instructions by the processor causing the controller to:
        obtain a respective desired fuel injection mass for the primary fuel injection and the secondary fuel injection;
        command the at least one fuel injector to deliver a primary pulse width and a secondary pulse width, the primary pulse width and the secondary pulse width being based in part on the respective desired fuel injection mass and respective initialized values of fuel injector slope;
        determine a calculated fuel mass based in part on at least one measured engine variable and obtain an estimated fuel mass based in part on the primary pulse width and the secondary pulse width;
        determine a converged primary fuel injector slope and a converged secondary fuel injector slope based in part on a comparison of the calculated fuel mass and the estimated fuel mass; and
        control operation of the at least one fuel injector based in part on the converged primary fuel injector slope and the converged secondary fuel injector slope.

2. The system of claim 1, wherein the predefined threshold is 5 milligrams.

3. The system of claim 1, wherein controlling operation of the at least one fuel injector includes:
    delivering the primary fuel injection with the primary pulse width ($W_P$) based on the converged primary fuel injector slope ($\theta_P^*$) and the respective desired fuel injection mass ($M_{P,Desired}$) of a subsequent engine event such that:

$$W_{P,K} = \frac{1}{\theta_P^*} M_{P,Desired};$$

and;
    delivering the secondary fuel injection with the secondary pulse width ($W_S$) based on the converged secondary fuel injector slope ($\theta_S^*$) and the respective desired fuel injection mass ($M_{S,Desired}$) of the subsequent engine event such that:

$$W_{S,K} = \frac{1}{\theta_S^*} M_{S,Desired}.$$

4. The system of claim 1, wherein obtaining the converged primary fuel injector slope and the converged secondary fuel injector slope includes:
    obtaining a primary fuel injector slope and a secondary fuel injector slope over a plurality of time steps, including a $k^{th}$ time step, based in part on the primary pulse width and the secondary pulse width; and
    updating the primary fuel injector slope and the secondary fuel injector slope at each of the plurality of time steps by minimizing a difference between the estimated fuel mass and the calculated fuel mass.

5. The system of claim 4, wherein:
    the primary fuel injector slope and the secondary fuel injector slope are updated based at least partially on a recursive least squares method.

6. The system of claim 4, wherein:
the at least one fuel injector is configured to deliver multiple secondary fuel injections each characterized by respective multiple secondary pulse durations; and
the estimated fuel mass ($M_{E,K}$) at the $k^{th}$ time step is based in part on the primary pulse width ($W_P$) at the $k^{th}$ time step, a summation of the respective multiple secondary pulse durations ($\Sigma W_s$), the primary fuel injector slope ($\theta_{P,K}$) at the $k^{th}$ time step and the secondary fuel injector slope ($\theta_{S,K}$) at the $k^{th}$ time step such that ($M_{E,K} = \theta_{P,K} W_P + \theta_{S,K} \Sigma W_s$).

7. The system of claim 4, wherein:
the converged primary fuel injector slope is obtained when a first difference between the primary fuel injector slope at the $k^{th}$ time step and the primary fuel injector slope at a (k−1) time step is less than a first predefined threshold; and
the converged secondary fuel injector slope is obtained when a second difference between the secondary fuel injector slope at the $k^{th}$ time step relative to the secondary fuel injector slope at the (k−1) time step is less than a second predefined threshold.

8. The system of claim 1, further comprising:
a mass air flow sensor and an air-to-fuel ratio sensor in communication with the controller and configured to obtain a mass air flow rate and an exhaust gas air-to-fuel ratio, respectively; and
wherein the calculated fuel mass is based at least partially on the mass air flow rate and the exhaust gas air-to-fuel ratio.

9. The system of claim 1, wherein the internal combustion engine includes at least one cylinder and further comprising:
a pressure sensor configured to dynamically monitor in-cylinder pressure generated in the at least one cylinder during each combustion event; and
wherein the calculated fuel mass is based in part on the in-cylinder pressure.

10. A method for controlling operation of an internal combustion engine in a vehicle having a controller and at least one fuel injector, the controller having a processor and tangible, non-transitory memory, the method comprising:
configuring the controller to selectively command the at least one fuel injector to deliver a primary fuel injection of a first fuel quantity and a secondary fuel injection of a second fuel quantity, the first fuel quantity being above a predefined threshold and the second fuel quantity being at or below the predefined threshold;
obtaining a respective desired fuel injection mass for the at least one primary fuel injection and the at least one secondary fuel injection, via the controller;
commanding the at least one fuel injector to deliver a primary pulse width and a secondary pulse width based in part on the respective desired fuel injection mass and respective initialized values of fuel injector slope, via the controller;
determining a calculated fuel mass based in part on at least one measured engine variable and obtain an estimated fuel mass based in part on the primary pulse width ($W_P$) and the secondary pulse width, via the controller;
determining a converged primary fuel injector slope and a converged secondary fuel injector slope based in part on a comparison of the calculated fuel mass and the estimated fuel mass, via the controller; and
controlling operation of the at least one fuel injector based in part on the converged primary fuel injector slope and the converged secondary fuel injector slope.

11. The method of claim 10, further comprising:
selecting the predefined threshold as 5 milligrams.

12. The method of claim 10, wherein controlling operation of the at least one fuel injector includes:
delivering the primary fuel injection with the primary pulse width ($W_P$) based on the converged primary fuel injector slope ($\theta_P^*$) and the respective desired fuel injection mass ($M_{P,Desired}$) of a subsequent engine event such that:

$$W_{P,K} = \frac{1}{\theta_P^*} M_{P,Desired};$$

and
delivering the secondary fuel injection with the secondary pulse width ($W_S$) based on the converged secondary fuel injector slope ($\theta_S^*$) and the respective desired fuel injection mass ($M_{P,Desired}$) of the subsequent engine event such that:

$$W_{S,K} = \frac{1}{\theta_S^*} M_{S,Desired}.$$

13. The method of claim 10, wherein obtaining the converged primary fuel injector slope and converged secondary fuel injector slope includes:
obtaining a primary fuel injector slope and a secondary fuel injector slope over a plurality of time steps, including a kth time step, based in part on the primary pulse width and the secondary pulse width; and
updating the primary fuel injector slope and the secondary fuel injector slope at each of the plurality of time steps by minimizing a difference between the estimated fuel mass and the calculated fuel mass.

14. The method of claim 13, wherein updating the primary fuel injector slope and the secondary fuel injector includes:
employing a recursive least squares method.

15. The method of claim 13, further comprising:
including multiple secondary fuel injectors in the at least one fuel injector and selectively commanding each to respective pulse durations; and
determining the estimated fuel mass ($M_{E,K}$) at the $k^{th}$ time step based in part on the primary pulse width ($W_P$) at the kth time step, a summation of the respective pulse durations ($W_s$), the primary fuel injector slope ($\theta_{P,K}$) at the $k^{th}$ time step and the secondary fuel injector slope ($\theta_{S,K}$) at the $k^{th}$ time step such that ($M_{E,K} = \theta_{P,K} W_P + \theta_{S,K} \Sigma W_s$).

16. The method of claim 13, further comprising:
obtaining the converged primary fuel injector slope when a first difference between the primary fuel injector slope at the $k^{th}$ time step and the primary fuel injector slope at the (k−1) time step is less than a first predefined threshold; and
obtaining the converged secondary fuel injector slope when a second difference between the secondary fuel injector slope at the $k^{th}$ time step relative to the secondary fuel injector slope at the (k−1) time step is less than a second predefined threshold.

17. The method of claim 10, further comprising:
employing a mass air flow sensor and an air-to-fuel ratio sensor to obtain a mass air flow rate and an exhaust gas air-to-fuel ratio, respectively; and determining the calculated fuel mass based at least partially on the mass air flow rate and the exhaust gas air-to-fuel ratio.

18. The method of claim 10, wherein the internal combustion engine includes at least one cylinder and further comprising:
　employing a pressure sensor to dynamically monitor in-cylinder pressure generated in the at least one cylinder during each combustion event; and
　determining the calculated fuel mass based at least partially on the in-cylinder pressure.

19. A system for controlling operation of an internal combustion engine in a vehicle having at least one fuel injector, the system comprising:
　a controller configured to selectively command the at least one fuel injector deliver a primary fuel injection of a first fuel quantity and a secondary fuel injection of a second fuel quantity, the first fuel quantity being above a predefined threshold and the second fuel quantity being at or below the predefined threshold;
　wherein the controller includes a processor and tangible, non-transitory memory on which instructions are recorded, execution of the instructions by the processor causing the controller to:
　　obtain a respective desired fuel injection mass for the primary fuel injection and the secondary fuel injection;
　　command the at least one fuel injector to deliver a primary pulse width and a secondary pulse width, the primary pulse width and the secondary pulse width being based in part on the respective desired fuel injection mass and respective initialized values of fuel injector slope;
　　determine a calculated fuel mass based in part on at least one measured engine variable;
　　obtain an estimated fuel mass based in part on the primary pulse width and the secondary pulse width;
　　determine a converged primary fuel injector slope and a converged secondary fuel injector slope based in part on a comparison of the calculated fuel mass and the estimated fuel mass; and
　　control operation of the at least one fuel injector based in part on the converged primary fuel injector slope and the converged secondary fuel injector slope; and
　wherein obtaining the converged primary fuel injector slope and converged secondary fuel injector slope includes:
　　obtaining a primary fuel injector slope and a secondary fuel injector slope over a plurality of time steps, based in part on the primary pulse width and the secondary pulse width; and
　　updating the primary fuel injector slope and the secondary fuel injector slope at each of the plurality of time steps by minimizing a difference between the estimated fuel mass and the calculated fuel mass.

\* \* \* \* \*